United States Patent [19]
Weis

[11] 3,750,323
[45] Aug. 7, 1973

[54] FISHING JIG

[76] Inventor: Dan N. Weis, c/o D.N. Weis Enterprises, 3530 Westgate Pky., Rockford, Ill. 61108

[22] Filed: June 21, 1971

[21] Appl. No.: 154,854

[52] U.S. Cl............ 43/42.28, 43/42.37, 43/42.39, 43/42.53, 43/44.81, 43/44.89
[51] Int. Cl............................................ A01k 85/02
[58] Field of Search........................ 43/42.28, 42.36, 43/42.37, 42.39, 44.89, 44.81, 42.53, 42.24, 42.25

[56] References Cited
UNITED STATES PATENTS

| | | | |
|---|---|---|---|
| 3,177,605 | 4/1965 | Segal | 43/42.28 |
| 1,518,199 | 12/1924 | Hennings | 43/42.37 |
| 1,994,692 | 3/1935 | Davenport | 43/42.28 X |
| 1,577,083 | 10/1925 | Peckinpaugh | 43/42.28 |
| 1,257,008 | 2/1918 | McCarthy | 43/42.37 |
| 3,500,574 | 3/1970 | Putnam | 43/42.25 |
| 1,986,738 | 1/1935 | Mitchell | 43/42.28 X |
| 2,793,461 | 5/1957 | Korte | 43/42.28 |
| 3,205,609 | 9/1965 | Knapton | 43/42.39 X |

Primary Examiner—Russell R. Kinsey
Assistant Examiner—James H. Czerwonky
Attorney—Wolfe, Hubbard, Leydig, Voit & Osann

[57] ABSTRACT

A fishing jig includes a hook upon the upper end of which is mounted a generally spherical lead head surrounding the shank and clamping an upper end portion of a lure body to the shank so that the lower end portion of the lure body conceals the hook. A central hole extending completely through the lead head cooperates with a pie-shaped radial slot which opens through the side of the lead head and into the upper end of the hole to form a passage having internal dimensions sufficient to permit the lead to be passed over the lower end of the hook and be placed upon the upper end of the hook. The upper end portion of the lure body is threaded through the hole alongside the shank of the hook, and the walls of the hole and slot are pinched together to clamp the lead head around the hook and lure body to prevent the resulting jig from coming apart when fishing.

3 Claims, 6 Drawing Figures

PATENTED AUG 7 1973 3,750,323

INVENTOR.
DAN N. WEIS,
BY
Wolfe, Hubbard, Leydig, Voit & Osann, Ltd.
ATTORNEYS.

FISHING JIG

BACKGROUND OF THE INVENTION

The invention relates generally to fishing jigs of the type with a lead head mounted on the upper end of a hook having an eye end projecting from one side of the lead head for attachment to a fishing line, the jig also including a lure body connected to the lead head to conceal the hook.

SUMMARY OF THE INVENTION

The primary object of the present invention is to provide a new and improved make-it-yourself fishing jig which is very simple and inexpensive to assemble and which can be made according to any design or style desired much more quickly and easily than prior jigs of the same general type.

A more detailed object is to utilize the lead head to hold the lure body of the jig on the hook without having to wind, tie or cement the lure body onto the lead head or the shank of the hook and to construct the lead head so that, when the jig has been assembled, the head will not slip on the shank of the hook if the jig happens to become snagged while fishing.

The invention also resides in the unique provision of a hole and slot in the lead head to receive and hold the hook and lure body selectively in place preparatory to pinching closed the hole and slot to clamp the lead head to the body and hook.

These and other objects and advantages of the invention will become more apparent from the following detailed description when taken in conjunction with the accompanying drawings.

DETAILED DESCRIPTION OF THE PREFERRED EMBODIMENT

Figure 1:
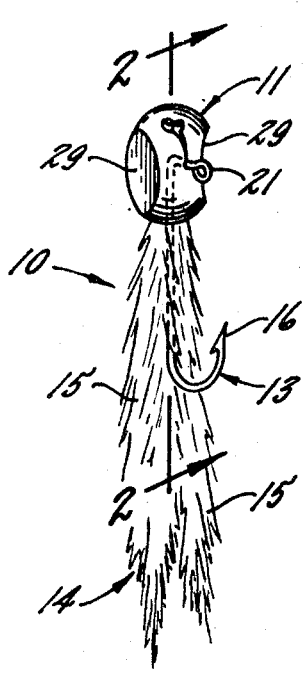
FIG. 1 is a perspective view of a fishing jig embodying the novel features of the present invention.
Figure 2:
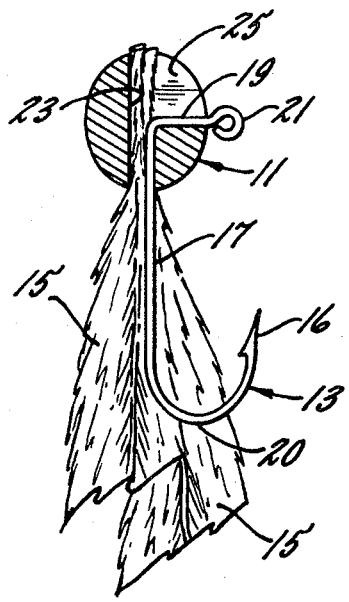
FIG. 2 is a cross-sectional view taken substantially along line 2—2 of FIG. 1.

As shown in the drawings for purposes of illustration, the present invention is embodied in an artificial fishing lure 10 of the type commonly referred to as a fishing jig. Typically, the fishing jig 10 includes a lead weight or lead head 11 attached to the upper end of a fish hook 13. A lure body 14, herein a pair of feather streamers 15, is mounted around the hook to camouflage the latter and provide an artificial bait attraction for fish. As shown in FIG. 2, the hook includes a short leg 16 with a barbed upper end and a long leg or shank 17 with an upper end portion 19 bent generally at a right angle away from the shank and out over a curved intermediate portion 20 spanning the distance between the short leg and shank. The lead head surrounds the right angle bend at the upper end of the shank with the lower end of the shank projecting from the bottom side of the lead head. An eye 21 on the upper tip end of the hook projects from the center of one side of the lead head to provide the connection for fastening the jig on the end of a fish line such as by means of a swivel clip (not shown).

While the jigs 10 as described thus far are available commercially, many fishermen prefer to make their own jigs not only to reduce the cost of the jigs but also so that they can fish with jigs of their own selected designs and styles. Heretofore, the making of a fishing jig acceptable to both fish and fishermen required skill, patience and time not necessarily available to all those wishing to take advantage of the benefits of one's own handcrafted jigs.

In accordance with the primary aspect of the present invention, provision is made of a new and improved make-it-yourself fishing jig 10 which is very easy to make in any desired design or style, which may be made in a very short period of time and which is low in cost and yet high in quality. To these ends, the lead head 11 itself is used as the means to hold the lure body 14 in position on the hook and includes the unique provision of a central hole 23 and a slot 24 (see FIG. 3) both of which are pinched closed to clamp the lure body and the hook 13 within the lead head. Advantageously, this novel construction of the lead head avoids the problems attendant with tieing, binding or cementing the lure body to the lead head. Thus, practically anyone can make his own high quality, low cost, fishing jig very easily and in a very short period of time.

Figure 3:
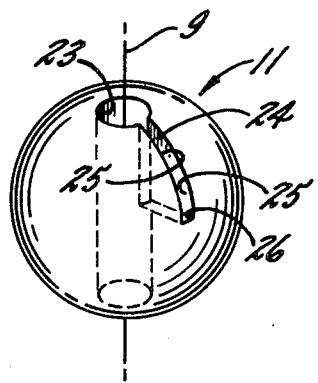
FIG. 3 is a perspective view of the lead head.

In the present instance, the lead head 11 is molded separately of the hook 13 in a generally spherical shape to include both the slot 24 and the hole 23. As shown in FIG. 3, the hole is cylindrical in shape and extends completely through the lead head along a diametrical axis $a$. The slot is narrower in width than the diameter of the hole and extends edgewise radially of the axis $a$ and lengthwise along the axis from the upper end of the hole to the approximate center of the lead head. The slot may be described with more particularity as being defined by two substantially parallel side walls 25 and an inner end wall 26 which extends between the two side walls radially of the axis $a$ at the center of the side of the lead head. During assembly of the jig, the hole and slot cooperate with one another to receive the hook (see FIG. 4) and the inner end wall 26 of the slot serves as an abutment surface for positioning the bent upper end portion 19 of the hook centrally in the lead head so that the eye 21 projects out the side of the lead head.

Figure 4:
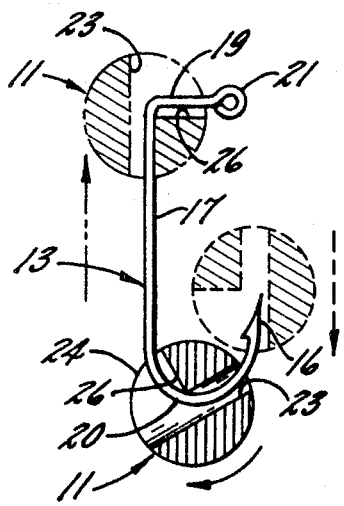
FIGS. 4 and 5 are schematic cross-sectional views showing successive steps of assembling the fishing jig.

To assemble the fishing jig 10, the lead head 11 is placed on the hook 13 is a sequence of steps as shown in FIG. 4. Then, the feather streamers 15 are threaded quill-end-first through the hole 23 and along the shank 17 while holding the hook in place (see FIG. 5). The walls of the slot 24 and hole thereafter are pinched together to clamp the feathers and hook in place (FIG. 6) and, finally, the quill ends of the feathers are trimmed flush with the upper end of the lead head to ready the latter for painting if so desired. When placing the lead head on the hook, the slotted end of the hole is telescoped over the short leg 16 of the hook with the slot facing the shank as shown in FIG. 4 so that the inner end surface 26 of the slot can slide across the curved intermediate portion 20 of the hook. Continued sliding of the lead head onto the hook turns the lead head clockwise to face the slot upwardly so that the inner end surface of the slot is in position to engage the upper end portion 19 and locate the latter centrally in the lead head.

Figure 5:
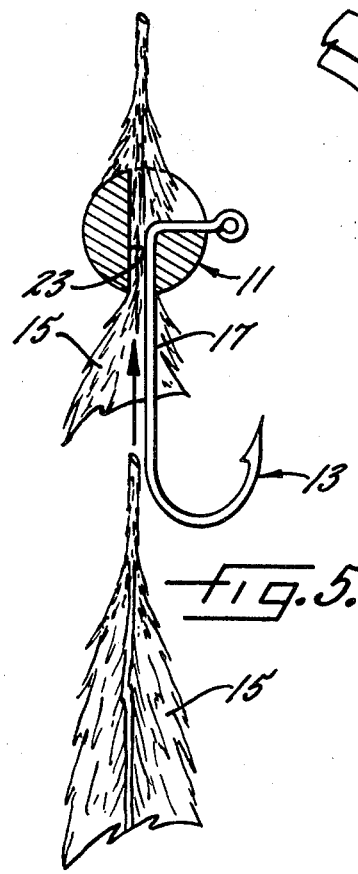

Once the lead head 11 has been positioned on the hook 13, each feather 15 is threaded upwardly through the unslotted end of the hole 23 and along the hook shank 17 as shown in FIG. 5 with the quill end of the feather protruding from the top side of the lead head. Advantageously, the diameter of the hole is such that the walls frictionally engage the feather streamers to confine and hold the latter in the lead head. The feathers thus are restricted from falling out of the head so that it is easy to adjust the position of the feathers relative to the hook simply by pulling on the projected quill ends of the feathers.

Figure 6:
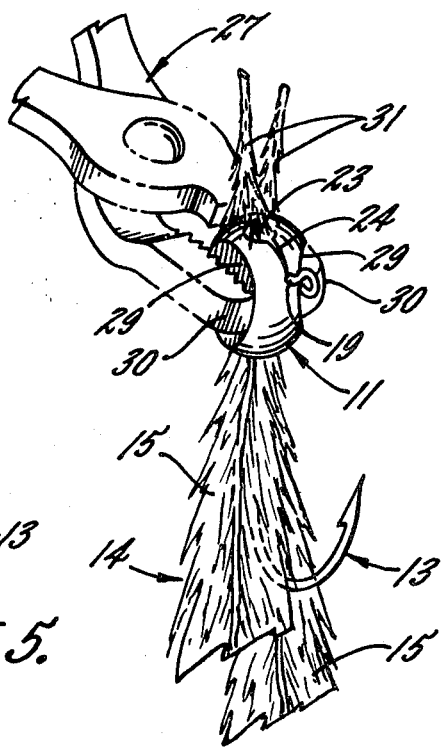
FIG. 6 is a perspective view of the final step of assembly.

After inserting the feather streamers 15 into the lead head 11 and positioning them as desired, the walls 25 of the slot 24 and the walls of the hole 23 are pinched together around the shafts of the feathers and the hook shank 17 by squeezing on opposite sides of the lead head with a pair of pliers 27 to create flats 29 on the sides of the lead head. As shown in FIG. 6, the jaws 30 of the pliers are squeezed against the sides of the lead head to locate the flats generally parallel with the side walls 25 of the slot. This forces the side walls together and around the bent upper end portion 19 of the hook with the result that the latter is held captive against the inner end wall 26 of the slot. At the same time that the side walls of the slot are pinched together, the walls of the hole are pinched toward each other to clamp against the shafts of the feathers and the hook shank to prevent the feathers from being pulled out of the lead head. Thus, the lead head is mounted securely on the upper end of the hook and is held against sliding on the shank by the pinched together walls of both the slot and hole, and the feather streamers are attached to the lead head by the clamping action of the walls of the hole. All that remains to complete the assembly of the fishing jig 10 is to cut off the exposed upper quill ends of the feathers, as indicated at 31 in FIG. 6, and paint the lead head if desired.

While the lure body 14 has been described as including two feather streamers 15, it will be appreciated that other materials would be equally well suited to function as the lure body. Moreover, the number of feathers employed to form the lure body is limited only by the size of the hole 23 in the lead head 11. For instance, at least eight feathers can be used to form the lure body when using, as in the present instance, a lead head having about a hole with a diameter of three thirty-seconds inch. Thus, the instant lead head allows a great deal of flexibility in the design and style of a particular jig. Also, fishing jigs as described herein can be made in as little as 90 seconds. Of additional advantage is the fact that the fishing jig 10 can be made quickly and easily under almost all conditions and does not have to be made at home. Jigs can be made in a boat, a car, while walking from one fishing spot to the next and even in the dark when fishing at night. Thus, the jig can be made literally on the spot. This is of particular advantage in that it allows one to make duplicates of particularly effective fishing jigs for instant use by others or for the replacement of a lost original.

It will be observed from the above that the present invention provides a unique make-it-yourself fishing jig 10 which is particularly adapted for very easy and quick assembly. Advantageously, the lead head 11 itself is used to clamp and hold the lure body 14 onto the shank 17 of the hook 13. The unique arrangement of the central hole 23 and the slot 24 permits easy placement of the lead head in position on the hook and further allows the lure body to be inserted and positioned as desired relative to the hook.

I claim as my invention:

1. A fishing jig comprising a fish hook whose eye-end portion is bent away from the shank so as to extend laterally from the shank in the same general direction as the hooked-end portion, a lure body having one end portion lying along the shank, and a one piece lead head of predetermined length including a front end and a rear end and having a central hole extending completely therethrough and receiving said shank and said one end portion of said lure body, a portion of said shank extending rearwardly beyond said rear end of said lead head, the walls of said hole frictionally engaging said one end portion and said shank to hold the lure body and shank together with the lead head after the body is moved into a selected position, said lead head also having a pie-shaped slot of length shorter than the predetermined length of said lead head opening out of the front end of the head and out of one side of the head and opening into one side of said hole to receive the eye-end portion of the hook, said slot having a closed end located intermediate the ends of said hole and abutting the eye-end portion of the hook, said hole and said slot forming a passage having internal dimensions sufficient to permit free movement of the hooked-end portion and shank therethrough, and the walls of said hole being pinched into clamping engagement with said shank and said lure body and the walls of said slot being pinched into clamping engagement with said eye-end portion thereby to hold said hook, said head and said body in tightly assembled relation.

2. A fishing jig as defined by claim 1 wherein said lure body comprises a feather whose shaft extends into said hole and is held by the walls of the hole, the plumage of the feather protruding from the end of the hole to conceal the hook.

3. A fishing jig as defined by claim 1 wherein said lead head as originally formed is generally spherical in shape, said hole is generally cylindrical in shape and extends diametrically through said lead head, and said slot extends edgewise generally radially of the central axis of the hole, and has a generally rectangular cross section of a width narrower than the diameter of said hole and a length extending along the central axis of said hole from the one end of the hole a distance approximately equal to one half the length of the hole, the closed end of the slot extending generally radially of the central axis of the hole.

* * * * *